Oct. 31, 1967

A. KAUFMAN ET AL  3,349,653

RATCHET SPANNER

Filed July 12, 1966

3,349,653
RATCHET SPANNER
Arnold Kaufman, London, Alfred Garrett Dunn, Enfield, and Sidney George Wright, Hollingbury, near Brighton, England, assignors to Leytool Limited, Leyton, England, a British company
Filed July 12, 1966, Ser. No. 564,560
Claims priority, application Great Britain, July 13, 1965, 29,609/65
1 Claim. (Cl. 81—60)

ABSTRACT OF THE DISCLOSURE

This invention consists of a double ended rachet spanner formed in two halves split about a plane at right angles to its axis of rotation and made of synthetic resin, at least one protuberance on one half mating with a cavity in the other half and having registering holes and a recess containing a spring and pawl, each half also provided with a snap-on joint.

---

The invention relates to ratchet spanners and has the object of providing a spanner which is easier and more economical to manufacture and easier to handle than previous ratchet spanners.

The invention consists in a double ended rachet spanner comprising a handle formed in two like halves split about a plane at right angles to the axis of rotation of the nut or bolt engaging member of the spanner, at least one protuberance upon one half of the handle, a recess which houses a pawl and spring means, one end of the pawl engages the teeth upon the periphery of the nut or bolt engaging member, wherein the improvement consists in that the recess which houses the pawl and spring means is in the protuberance, registering holes are provided in the halves for receiving fastening means, and the handle is made of synthetic resin each half of which is provided with a pair of snap-on joints which hold the halves together.

Figure 1:
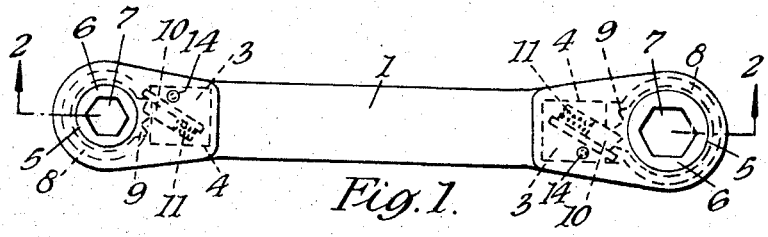
Figure 2:
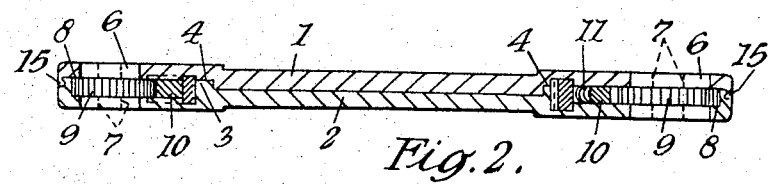
Figure 3:
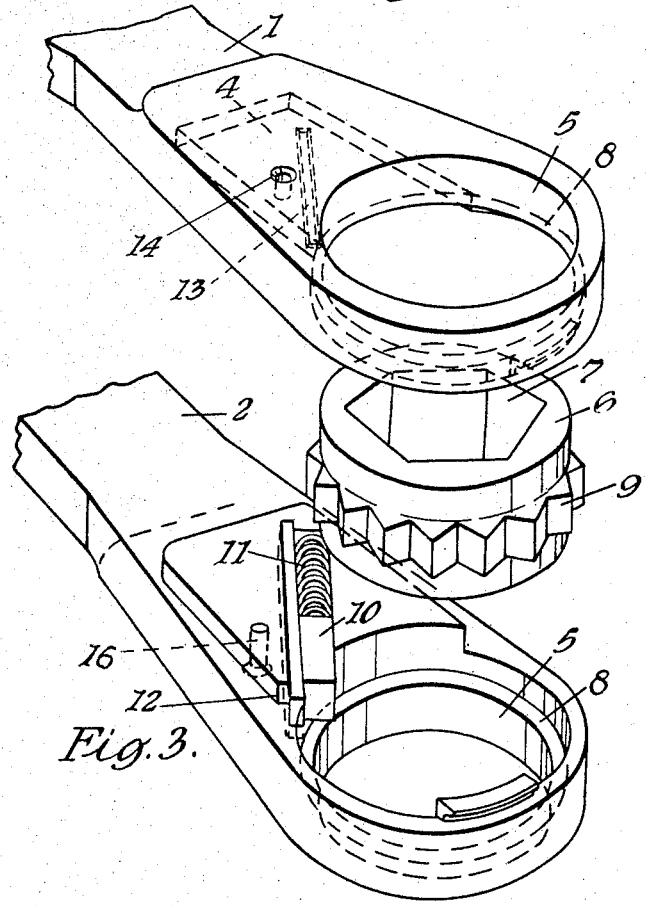

The accompanying drawing shows, by way of example only, one embodiment of the invention in which:

FIGURE 1 is a plan view of a double ended ratchet spanner constructed in accordance with the invention, FIGURE 2 is a longitudinal section of the spanner on the line 2—2 of FIGURE 1, while, FIGURE 3 is an exploded perspective view of one end of the spanner.

The handle of the spanner is made in two parts, 1 and 2, of a thermoplastic material of the family of polyamides which provide for electrical insulating properties and is sterilisable in boiling water or steam under pressure for surgical applications and needs no lubrication. The two parts are of similar shape and differ only in that a protuberance 3 enters a recess 4 at each end and thus holds the two parts of the handle in register with one another. Both ends are provided with lip and recess 15 to produce a "snap-on" joint, and thus the two parts 1 and 2 can be conveniently joined together assisted by riveting and/or adhesive, one or more countersunk holes 14 being provided moulded through the protuberance 3 to accommodate rivets 16.

At each end of the tool there is provided a circular bore 5 within which is located a hollow steel drum-like member 6 having a shaped aperture 7 for the receipt of the nut, bolt or shaft to be rotated. The sides of the bore 5 in the handle are stepped at 8, and in the annular groove thus formed, the teeth 9 are accommodated, thus retaining the drum-like member in the bore.

There is provided a recess in the protuberance 3 which contains a steel pawl 10 which is urged to engage the teeth 9 by the helical spring 11. The pawl 10 is supported by a steel wear plate 12 which is retained in position by the deeper recess 13 inside plates 1 and 2. Each drum-like member is therefore free to rotate in the one direction and is prevented by the pawl from rotating in the other direction. The shaped apertures 7 at the opposite ends of the tool are conveniently made of different sizes to fit different sizes of nuts, bolts, shafts, etc.

The tool formed in accordance with the invention is light in weight, is easy and comfortable to handle during use, and owing to its method of manufacture is cheaper to produce than corresponding ratchet spanners heretofore proposed.

It is to be understood that the above description is by way of example only, and that details for carrying the invention into effect may be varied without departing from the scope of the invention.

We claim:

A double ended rachet spanner comprising a handle formed in two like halves split about a plane at right angles to the axis of rotation of the nut or bolt engaging member of the spanner, at least one protuberance upon one half of the handle, a recess which houses a pawl and spring means, one end of the pawl engages the teeth upon the periphery of the nut or bolt engaging member, wherein the improvement consists in that the recess which houses the pawl and spring means is in the protuberance, registering holes are provided in the halves for receiving fastening means, and the handle is made of synthetic resin each half of which is provided with a pair of snap-on joints which hold the halves together.

References Cited

UNITED STATES PATENTS

| | | | |
|---|---|---|---|
| 12,198 | 1/1855 | Everitt | 81—60 |
| 574,094 | 12/1896 | Kaufman et al. | 81—60 |
| 966,130 | 8/1910 | Schneider | 81—60 |
| 1,614,039 | 1/1927 | Mandl | 81—60 |
| 2,788,574 | 4/1957 | Marcmann | 30—332 X |
| 3,077,034 | 2/1963 | Stineman | 30—332 X |

JAMES L. JONES, JR., *Primary Examiner.*